US008182920B2

(12) United States Patent
Feeney et al.

(10) Patent No.: US 8,182,920 B2
(45) Date of Patent: May 22, 2012

(54) CONCENTRATED AQUEOUS NANOCOMPOSITE DISPERSIONS FOR BARRIER COATINGS

(75) Inventors: Carrie A. Feeney, Bridgewater, NJ (US); Harris A. Goldberg, Edison, NJ (US); Michele Farrell, Bethlehem, PA (US); Douglas P. Karim, Green Brook, NJ (US)

(73) Assignee: Inmat Inc., Hillsborough, NJ (US)

( * ) Notice: Subject to any disclaimer, the term of this patent is extended or adjusted under 35 U.S.C. 154(b) by 895 days.

(21) Appl. No.: 11/901,192

(22) Filed: Sep. 14, 2007

(65) Prior Publication Data

US 2008/0131707 A1   Jun. 5, 2008

Related U.S. Application Data

(60) Provisional application No. 60/846,226, filed on Sep. 21, 2006.

(51) Int. Cl.
*B32B 9/00* (2006.01)
*C08K 3/34* (2006.01)

(52) U.S. Cl. .................. 428/446; 524/445; 524/446

(58) Field of Classification Search .................. 524/445, 524/446; 428/446
See application file for complete search history.

(56) References Cited

U.S. PATENT DOCUMENTS

| 4,472,538 | A | 9/1984 | Kamigaito et al. | 523/202 |
|---|---|---|---|---|
| 4,889,885 | A | 12/1989 | Usuki et al. | 524/445 |
| 4,911,218 | A | 3/1990 | Patitsas | 152/525 |
| 5,049,609 | A | 9/1991 | Patitsas | 524/386 |
| 5,178,702 | A | 1/1993 | Frerking, Jr. et al. | 152/510 |
| 6,087,016 | A | 7/2000 | Feeney et al. | 428/454 |
| 6,232,389 | B1 | 5/2001 | Feeney et al. | 524/450 |
| 6,831,123 | B1 * | 12/2004 | Chisholm et al. | 524/445 |
| 7,078,453 | B1 * | 7/2006 | Feeney et al. | 524/493 |
| 7,119,138 | B1 * | 10/2006 | Feeney et al. | 524/450 |
| 7,473,729 | B2 * | 1/2009 | Feeney et al. | 524/445 |
| 2007/0213446 | A1 * | 9/2007 | Feeney et al. | 524/445 |

FOREIGN PATENT DOCUMENTS

| JP | 11-246729 | 9/1999 |
|---|---|---|
| WO | WO 98/56861 | 12/1998 |
| WO | WO 00/49072 | 8/2000 |
| WO | WO 2005/063871 | 4/2005 |

OTHER PUBLICATIONS

W. J. Ward et al., "Gas Barrier Improvement Using Vermiculite and Mica in Polymer Films", Journal of Membrane Science, 55:173-180 (1991).
Yano, K. et al., "Synthesis and Properties of Polyimide-Filler Hybrid Composites", Journal of Polymer Science A: Polymer Chemistry, 35, 2289 (1997).
Wu, Y-P et al.,"Structure of Carboxylated Acrylonitrile-Butadiene Rubber (CNBR)-Filler Nanocomposites by Co-coagulating Rubber Latex and Filler Aqueous Suspension", Journal of Applied Polymer Science, 82, 2842-2848 (2001).
Wu, Y-P et al., "Structure and Properties of Nitrile Rubber (NBR)-Filler Nanocomposites by Co-coagulating NBR Latex and Filler Aqueous Suspension", Journal of Applied Polymer Science, 89, 3855-3858 (2003).
Varghese and Karger-Kocsis, "Natural Rubber-Based Nanocomposites by Latex Compounding with Layered Silicates", Polymer (in press) (2003).
Goldberg et al., "Nanocomposite Barrier Coatings for Elastomeric Applications", Materials Research Society, Symposium T: Polymer nanocomposites, paper T4.7, (Apr. 2002).
Goldberg et al, "Elastomeric Barrier Coatings for Sporting Goods", ACS Rubber Section, Apr. 29, 2002, paper 17, published in Rubber World, vol. 226, No. 5, p. 15 (Aug. 2002).

* cited by examiner

*Primary Examiner* — Vicky Nerangis
(74) *Attorney, Agent, or Firm* — Michael W. Ferrell

(57) ABSTRACT

A concentrated nanocomposite dispersion which includes a silicate filler and a matrix polymer dispersed in an aqueous medium. The dispersions are condensed by selectively removing liquid therefrom, to provide high solids coating formulations. The concentrated formulations provide coatings which are good barriers to oxygen and other gases.

10 Claims, 1 Drawing Sheet

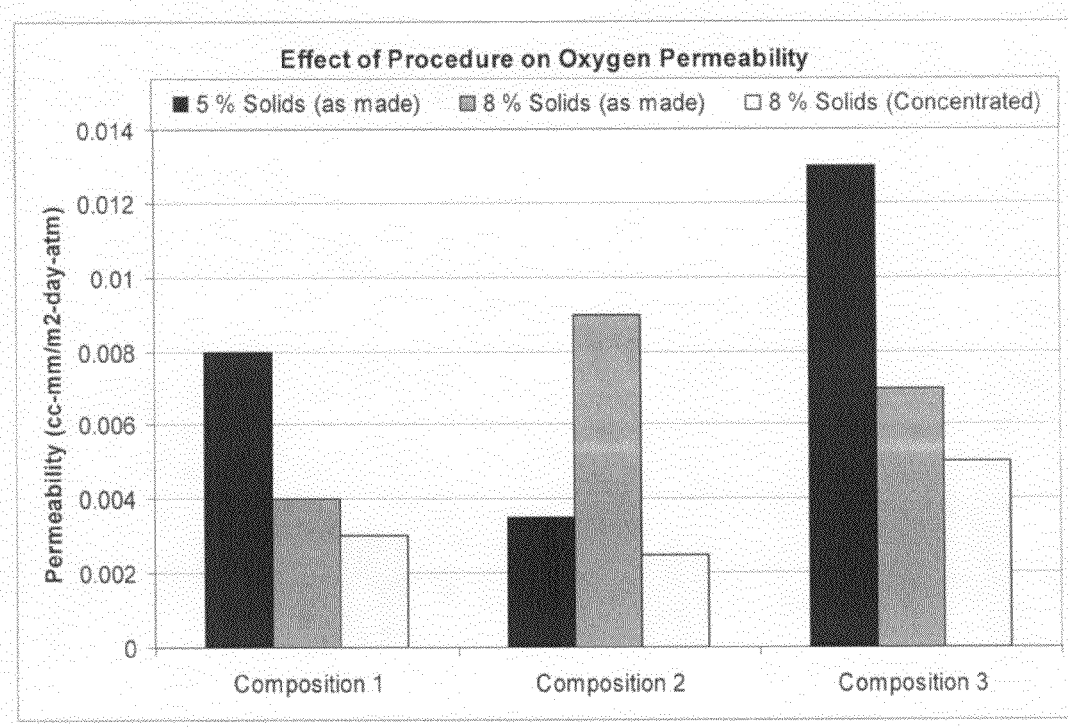

CONCENTRATED AQUEOUS NANOCOMPOSITE DISPERSIONS FOR BARRIER COATINGS

CLAIM FOR PRIORITY

This non-provisional application is based upon U.S. Provisional patent application Ser. No. 60/846,226, of the same title, filed Sep. 21, 2006. The priority of U.S. Provisional patent application Ser. No. 60/846,226 is hereby claimed and the disclosure thereof is incorporated into this application by reference.

FIELD OF INVENTION

The present invention relates generally to nanocomposite dispersions which are used to provide coatings having enhanced barrier properties. Specifically, the invention relates to nanocomposite dispersions which include exfoliated silicate filler, a film forming polymer, and water. The dispersions are condensed by selectively removing a portion of the aqueous medium.

BACKGROUND OF THE INVENTION

Barrier coatings which prevent, reduce, or inhibit the permeation of a selected substrate with a gas, vapor, chemical and/or aroma have been widely described, and such coatings are used in a variety of industries, e.g., the packaging industry, automobile industry, paint industry, and tire industry. For example, butyl rubber in automobile tires has been coated with formulations which includes a polymer and a platelet filler, in order to reduce the air permeability of the tire. See, e.g., U.S. Pat. Nos. 4,911,218 and 5,049,609. Tires with integral innerliners are disclosed in U.S. Pat. No. 5,178,702, wherein the tire includes rubber laminate in which at least two layers are barrier layers having 100 parts by weight rubber, 100 parts by weight acrylonitrile/diene polymer and about 25-150 parts by weight of platelet filler of unspecified width and thickness. These compositions are stated to reduce the costs of the innerliners while maintaining flexibility and barrier performance.

The use of exfoliated silicates to produce nanocomposite barrier coatings has been achieved by several methods. The most widely used has been by combining a dissolved polymer with exfoliated filler. Water soluble polymers such as polyvinyl alcohol (PVOH) have been combined with water exfoliated filler such as vermiculite. See, Japan Patent 11-246729, Sep. 14, 1999, "Gas-Barrier Poly(vinyl alcohol)/poly (acrylic acid) Compositions and their Laminates and Shaped Articles." Sumitomo Chemical Co., Ltd. Polycarbonate polymers have been dissolved in toluene and combined with organically functionalized filler to form good barrier coatings. W. J. Ward et al., "Gas Barrier Improvement Using Vermiculite and Mica in Polymer Films", *Journal of Membrane Science*, 55:173-180 (1991)]. Other polymers have also been made into improved barrier coatings by dissolving them in a solvent, and using an organically functionalized filler to improve the barrier properties. See, e.g., Yano, K. et al., "Synthesis and Properties of Polyimide-Filler Hybrid Composites", *Journal of Polymer Science A: Polymer Chemistry*, 35, 2289 (1997).

There are several examples of using an aqueous dispersion of exfoliated filler with an aqueous dispersion of polymer to form a nanocomposite. Most of that work used elastomeric polymers in suspension. See, for example, Wu, Y-P et al., "Structure of Carboxylated Acrylonitrile-Butadiene Rubber (CNBR)-Filler Nanocomposites by Co-coagulating Rubber Latex and Filler Aqueous Suspension", *Journal of Applied Polymer Science*, 82, 2842-2848 (2001); Wu, Y-P et al., "Structure and Properties of Nitrile Rubber (NBR)-Filler Nanocomposites by Co-coagulating NBR Latex and Filler Aqueous Suspension", *Journal of Applied Polymer Science*, 89, 3855-3858 (2003); Varghese and Karger-Kocsis, "Natural Rubber-Based Nanocomposites by Latex Compounding with Layered Silicates", *Polymer* (in press) (2003); Feeney et al., U.S. Pat. No. 6,087,016, "Barrier Coating of an Elastomer and a Dispersed Layered Filler in a Liquid Carrier", Jul. 11, 2000; Feeney et al., U.S. Pat. No. 6,232,389, "Barrier Coating of an Elastomer and a Dispersed Layered Filler in a Liquid Carrier and Coated Articles", May 15, 2001; Goldberg et al., "Nanocomposite Barrier Coatings for Elastomeric Applications", *Materials Research Society, Symposium T*: Polymer nanocomposites, paper T4.7, (April 2002); and Goldberg et al, "Elastomeric Barrier Coatings for Sporting Goods", ACS Rubber Section, Apr. 29, 2002, paper 17, published in *Rubber World*, vol. 226, No. 5, p. 15 (August 2002).

Other references of interest include U.S. Pat. No. 4,472,538 to Kamigaito et al.; U.S. Pat. No. 4,889,885 to Usuki et al.; U.S. Pat. No. 6,087,016 to Feeney et al.; and U.S. Pat. No. 6,232,289 to Feeney et al.

Despite the contributions in the art, there exists a need for an aqueous coating composition that exhibits enhanced barrier properties, which may be applied to other polymer films. Such a coating would be particularly useful in packaging applications where the package contents spoil or degrade upon contact with air. There further exists a need for a coating material which can be provided in a processable and economical form, whereby the coating can be produced at a high solids content without gelling.

SUMMARY OF THE INVENTION

According to one aspect of the present invention there is provided a concentrated dispersion for forming a nanocomposite barrier coating on a substrate, where the barrier coating includes (a) a liquid carrier medium which is primarily water, i.e., at least 50 wt. %; (b) an exfoliated silica filler material that is dispersed in the liquid carrier medium; and (c) a matrix polymer which is dispersed in the carrier medium. The dispersions are concentrated by dispersing the filler material and polymer matrix in the liquid medium, and increasing the solids content of the initial dispersion by selectively removing a portion of the liquid carrier medium prior to applying the dispersion to the substrate. The method of preparation of the concentrated dispersions imparts unique characteristics and is intended as a feature of the dispersion and coatings, not merely a step in the preparation thereof.

Still further features and advantages of the invention are apparent from the following description.

BRIEF DESCRIPTION OF THE DRAWINGS

The invention is described in detail below with reference to the drawing:

FIG. 1 is a diagram showing the oxygen permeability values of three compositions prepared according to different methods, where it is seen that the concentrated dispersions of the invention have the lowest permeability.

DETAILED DESCRIPTION OF THE INVENTION

The invention is described in detail below for purposes of illustration only. Modifications within the spirit and scope of the invention, set forth in the appended claims, will be readily apparent to one of skill in the art. Unless defined otherwise, terminology and abbreviations, as used herein, have their ordinary meaning.

The phrase "concentrated dispersion," "concentrated nanocomposite dispersion," or like terminology refers to a suspension, dispersion, emulsion, or slurry of exfoliated silicate filler material and a matrix polymer in a liquid carrier medium, where the dispersion is concentrated by removal of a portion of the liquid carrier medium.

The term "nanocomposite" or "filled polymer nanocomposite" refers to the mixture of substantially exfoliated filler and polymer.

The "oxygen transmission rate," or "OTR," of the coatings used in the invention is measured according to ASTM D-3985-02 or any other suitable protocol using a MOCON® OXTRAN 2/20 module and the following conditions: pressure of 1 atm, a temperature of 23° C., and a relative humidity of 0%.

The present invention relates to nanocomposite coating formulations that include, at a minimum, exfoliated silicate filler material and a matrix polymer which are dispersed in a liquid carrier medium. The coating formulations of the invention are concentrated dispersions which have a unique method of preparation—the silicates and the polymer matrix are dispersed in a liquid carrier medium, and then a portion of the liquid medium is selectively removed from the dispersion, such that the solids content of the dispersion is increased.

The liquid carrier medium used in the invention is aqueous; that is, it is at least 50 percent water, and typically consists essentially of water. Minor amounts of organic solvents may be included in the carrier medium if desired. Suitable solvents may include ethanol, methanol, isopropanol, toluene, hexane, other hydrocarbons, and combinations thereof.

The exfoliated silicate filler materials which are dispersed in the liquid carrier medium include layered clay compounds which are made of platelets having a high aspect ratio. "Exfoliation" is defined for layered fillers as the separation of individual layers of the platelet particles; the filler material used in the invention is at least partially exfoliated, and preferably is substantially exfoliated. The aspect ratio is the product of the lateral dimension of a platelet filler particle divided by the thickness of the platelet. The aspect ratio of the filler used in the invention is typically at least 50, at least 1,000, and preferably at least 5,000 up to about 30,000. The thickness of at least some filler particles is below 1 micron, and probably well below 100 nm, preferably less than 10 nm. The exfoliated silicate filler material may include, for example, bentonite, vermiculite, montmorillonite, nontronite, beidellite, volkonskoite, hectorite, saponite, laponite, sauconite, magadiite, kenyaite, ledikite and mixtures thereof. The most preferred fillers are montmorrilonite or vermiculite. Suitable montmorillonites are commercially available as SCPX-2973 exfoliated montmorillonite slurry, SCPX-2953 exfoliated montmorillonite solid, and SCPX-2041 exfoliated montmorillonite solid and slurry, all from Southern Clay Products (Gonzales, Tex.).

The silicate filler material may be acid or base pre-treated as is known in the art. The preferred acids for filler pre-treatment are selected from acetic acid, glycine and citric acid, and the preferred bases are selected from ammonium hydroxide, sodium hydroxide and potassium hydroxide. The amount of acid or base employed should be in the amount of from about 10% to about 20% by weight of the dried barrier coating.

The exfoliated filler material is present at between about 5 to about 80% by weight of the total solids of the coating formulations, and preferably from 20 to 50 weight percent of the total solids. The compositions of the present invention, when dried, retain the filler in well-dispersed form, resulting in greatly improved permeability properties.

The matrix polymers useful in the coating formulations of the present invention are not particularly limited. The matrix resins may include homopolymers and/or copolymers, and are dispersed in the liquid carrier medium as an emulsion or latex. The matrix polymer forms a film in the inventive coatings, in which the platelet particles are dispersed to form a nanocomposite barrier coating. The matrix polymer may be present in amounts of from 5 to 80 weight percent of the total solids in the dispersion, preferably from 30 to 60 weight percent.

Preferred resins include polymers selected generally from among many classes. The selected polymers may be curable polymers, partially cured polymers, or uncured polymers, and are dispersible in water. Such polymers include, without limitation, olefinic thermoplastic elastomers; polyamide thermoplastic elastomer; polybutadiene thermoplastic elastomer, e.g., syndiotactic 1,2-polybutadiene thermoplastic elastomer; polyester thermoplastic elastomer; polyurethane thermoplastic elastomer, e.g., thermoplastic polyester-polyurethane elastomer, and thermoplastic polyether-polyurethane elastomer; styrenic thermoplastic elastomer; vinyl thermoplastic elastomer, e.g., polyvinyl chloride polyol (pPVC).

A variety of rubbery polymers may also be employed as the polymer component of the inventive method, including acrylic rubber, such as ethylene-acrylate copolymer; and butadiene rubber, such as polybutadiene. Still other polymers are chlorosulfonated polyethylene rubber, e.g., chlorosulfonated polyethylene; epichlorohydrin rubber, such as polyepichlorohydrin (CO), polyepichlorohydrin copolymer; ethylene-propylene rubber, such as ethylene-propylene copolymer, ethylene-propylene-diene copolymer. Other suitable polymers may include fluoroelastomers, for example, vinylidene fluoride-hexafluoropropylene copolymer; natural rubber; neoprene rubber such as polychloroprene; nitrile rubber, for example, acrylonitrile-butadiene copolymer; polysulfide rubber; polyurethane, for example, polyester urethane, and polyether urethane; propylene oxide rubber; silicone rubber, for example, methylvinyl-fluorosilicone, and styrene-butadiene rubber, for example, styrene-butadiene copolymer.

Non-elastomeric polymers may also be used, including polyesters, polyamides, chlorinated polymers, polyolefins, polyurethanes, polyethers, polyketones, polycarbonates, acrylics, vinylics, and flouropolymers. Non-elastomeric polymers are generally considered to be those which have a glass transition temperature of greater than 23° C., and/or those with crystallinity above 10%.

Suitable polymers include polyester resins, such as those which are commercially available as Eastek (Eastman Chemical Company, Kingsport Tenn.). The Eastek polymers are sulfopolyesters with a Tg of from about 30 to 35° C.

The barrier coating formulations of the invention may optionally employ at least one or more than one suitable surfactant to reduce surface tension, and aid in dispersion. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried barrier coating uncompromised by residual surfactant. In the event of an unfavorable interaction of the anionic emulsifier present in the latex dispersion, additional ionic additives should be kept to a minimum. This variable is eliminated where the surfactant or emulsifier is non-ionic. Increase in ionic concentration of the compositions, such as by the addition of a base to adjust pH, e.g., KOH, NH₄OH and NaOH, may cause agglomeration of the filler, which adversely affects permeability reduction.

Desirable surfactants may include SURFYNOL® PSA 336 (Air Products, Inc.), SILWET® L-77 (OSI Specialties, Inc.), and ZONYL FSP and 8952 (DuPont Performance Chemicals and Intermediates). The amount and number of surfactants added to the coating composition will depend on the particular surfactant(s) selected, but should be limited to the minimum amount of surfactant that is necessary to achieve wetting of the substrate while not compromising the performance of the dried barrier coating. For example, typical surfactant amounts can be less than or equal to about 15% by weight of the dried barrier coating.

The dispersions may also include additional additives such as biocides, colloidal dispersants, anti-foaming agents, dispersing agents, wetting agents, leveling agents, and thickeners. Other optional components of the coating mixture include conventional agents to adjust pH, such as bases, e.g., NH₄OH, NaOH or KOH; or acids, e.g., acetic acid, citric acid or glycine provided that care is taken to avoid agglomeration, as discussed above.

Further details as to compositions and methods of forming coatings are found in copending U.S. patent application Ser. Nos. 11/113,349; 11/272,351; 10/741,741; 10/741,251; and 10/742,542, the entireties of which are incorporated herein by reference.

As noted above, the dispersions of the invention are produced according to a method whereby the silicate filler and polymer component are dispersed in the liquid medium at a given concentration, and this initial dispersion is subsequently condensed by selectively removing a portion of the liquid carrier medium. In the condensing step, a portion of the liquid carrier medium is selectively removed to increase the solids content of the dispersion. Suitable removal methods include evaporation, distillation, and the like. The liquid may be evaporated off by heating; preferably at a temperature of from about 80° C. to about 100° C. for about 70 to about 100 minutes while stirring until about 1% to about 30% of the liquid carrier evaporates.

The dispersions are typically condensed such that the solids content of the dispersion increases by at least 5%, i.e., has a solids content of at least 1.05 times that of the initial, unconcentrated dispersion. More preferably, enough liquid is removed such that the solids content increases by at least 25% or at least 50%. The concentrated dispersion generally includes from about 5 to 25 weight percent solids, and preferably from about 7 to 15 weight percent solids. Before it is concentrated, the dispersion typically includes from about 3 to 7 weight percent solids. It is unexpected that the dispersion may be concentrated by evaporation without causing the formulation to gel. For example, many silicate filler materials, such as montmorillonite, form gels at relatively low solids content, and the solids content of the silicate component often limits the final solids content of the barrier coating.

The coating formulations of the invention are generally applied to a substrate and dried to form a low permeability barrier coating. The coating films that are produced provide an excellent gas barrier. Generally, the coatings produced according to the invention exhibit a reduction in oxygen permeability of at least 100-fold as compared to a similar barrier coating which does not include silicate filler material. More preferably, the barrier coating produced according to the present invention exhibits at least a 200-fold, at least a 400-fold, and even more than 900-fold reduction in gas permeability as compared to a barrier coating which does not include the silicate filler material. Suitable permeability values for the coating may be less than 0.02 cc-mm/m²-day-atm, or less than 0.01 cc-mm/m²-day-atm.

Furthermore, it has been surprisingly discovered according to the present invention that coatings which were made from concentrated dispersions, i.e. condensed, exhibit superior oxygen barrier properties as compared with a like coating (same composition and thickness) which is prepared from a like dispersion that did not undergo selective removal of the liquid carrier medium, i.e., a dispersion that is prepared by adding the filler material at higher solids content in polymer latex, without subjecting the dispersion to substantial evaporation or other liquid removal. Remarkably, the barrier properties of the invention are superior to uncondensed formulations, even where the solids content and composition are the same. As compared to films formed from dispersions which did not undergo an evaporation step, the inventive coatings exhibit permeability values that are at least 10 percent, and preferably at least 20 percent lower.

In addition to reduced gas permeability, the high solids coating formulation produced in accordance with the present invention provides a product with reduced drying times, higher viscosity and thus thicker dip coated samples in a single step, better suspension stability, reduced shipping costs, thicker spray coatings without dripping, reduced penetration of coating into substrate porosity and defects, and thicker coating in continuous film and paper coating applications.

The substrate used with the inventive coatings is not particularly limited and may include polymeric films, elastomeric substrates, metal foils, and cellulosic substrates such as paper, paperboard, among other substrates. The substrates may be films, corrosion protective films, vacuum and controlled atmosphere packages, blow molded containers, thermoformed containers, and electronic display films among others.

According to one aspect of the invention, there is provided a method of making an article of manufacture with a barrier coating film, including (a) preparing an aqueous dispersion which includes a matrix polymer and an exfoliated silicate filler material; (b) concentrated the dispersion by evaporating water therefrom, such that the solids content of the dispersion increases by 5 percent; (c) applying the concentrated dispersion to a substrate; and (d) drying the concentrated dispersion to produce a barrier coating film which has a permeability that is at least 200 times lower than a like coating film that is prepared without the silicate filler material.

Suitable articles for the barrier coatings of the present invention include gloves, tennis balls, basketballs, soccer balls, footballs, volley balls, racket balls, handballs, beach balls, and toy balls and inflated products such as automobile and truck tires, bicycle tires, boats, air mattresses and inflatable beds.

The coatings of the invention are particularly suitable for use in packaging material, whereby the barrier coating is applied to a polymeric film substrate or paperboard substrate, and is used to package goods which are sensitive to gases such as oxygen, for example, food, drinks, electronic components, pharmaceuticals, and the like.

EXAMPLES

In the following examples, nanocomposite barrier coating films are prepared and applied to polyester film substrates, and then are tested for oxygen transmission rate. The nanocomposite barrier coating films are prepared in an aqueous medium with a polyester resin (Eastek 1000, Eastman, 30% polymer solids) as the polymer matrix and montmorrillonite (SCPX-2973, SCPX-2953, or SCPX-2041) as the exfoliated silicate filler.

Experimental Procedures

Oxygen Transmission Rate (OTR) Testing

Films and coated substrates are tested for oxygen transmission rate using a Mocon OXTRAN 2/20 or 2/60 module at 23° C., 0% RH, and 1 atm. The samples are loaded onto the modules and conditioned for 2 hours prior to testing for oxygen. Once equilibrium is reached, an OTR is reported in units of $cc/m^2$ day atm.

Thickness Measurements

All thickness calculations are based on the weight of the coating, and an assumed density. For the purposes of the present invention, the density for the polymer phase is assumed to be 0.95 gm/cc in all cases, even though it is recognized that each polymer has a different density. The density of the nanocomposite was estimated using a rule of mixtures, and an assumed density of the clay of 2 gm/cc.

The thickness of the coating on a substrate is measured after the OTR is reported. Each sample is removed from the Mocon module and a circle of specified size is cut from the sample. The cut circle is weighed. The weight of the coating is obtained from subtracting the weight of the uncoated circle, and the thickness calculated from the size of the circle and weight of the coating. For coating thickness less than 5 microns, the thickness is measured using an optical profilometer. The thickness of the film is reported in millimeters and used to calculate the permeability of the film.

The permeability of the coatings is calculated as follows:

$$\text{Permeability of barrier coating} = \frac{X_1}{[(1/OTR) - (X_2/P_{X2})]}$$

where $X_1$ is the barrier coating thickness; $X_2$ is substrate thickness, $P_{X2}$ is permeability of the substrate, and OTR is oxygen transmission rate measured for the barrier coating. The reduction in permeability is calculated as follows:

$$\text{Reduction in permeability} = \left[1 - \frac{\text{Permeability of a barrier coating prepared according to the inventive method}}{\text{Permeability of a barrier coating prepared by other method}}\right] \times 100\%$$

The benefit of obtaining the permeability of the coating versus the OTR of the sample is that permeability reports the OTR at a specified thickness. Therefore, coatings with different thicknesses can be compared directly. OTR units are $cc/m^2$ day at 1 atmosphere, 0% relative humidity at 23° C.

Example 1A

5% Solids Polyester Nanocomposite Using SCPX-2973 Montmorrillonite Slurry

In an 8 oz jar, 0.02 grams of Acusol® 880 (35.2%, Rohm & Haas), 0.05 grams of Acusol® 882 (17.1%, Rohm & Haas) and 41.54 grams of distilled water were weighed. A stir bar was added and the solution was stirred until the Acusol materials were dissolved. To this solution was added a mixture of 5.65 grams of polyester latex (Eastek 1000, Eastman) and 1 drop of Surfynol® PSA 336 (Air Products, 100%). The resulting solution was mixed thoroughly.

To the above solution, 14.25 grams of montmorrillonite SCPX-2973 slurry (9.21% silicate filler) was mixed with 3.49 grams of glycine (Lab Safety Supply, 20% glycine by weight) and 10 grams of distilled water. The resulting solution was stirred with a stir bar for 1 hour and 1 drop of Mergal 680 (Troy Chemical Corporation, 26.3% by weight anti-microbial) was added. The percent solids of the formulation were measured as 5.0%, using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 11.9 $cc/m^2$ day @ 1 atmosphere, 0% RH, 23° C. Permeability of the 0.5 micron polyester nanocomposite is 0.008 cc $mm/m^2$ day atmosphere @ 0% RH, 23° C. The reduction in permeability of this coating is 337 times the reduction in permeability of a coating made from the unfilled polyester latex.

Example 1B

8% Solids Polyester Nanocomposite Using SCPX-2973 Montmorrillonite Slurry

In an 8 oz jar, 0.04 grams of Acusol® 880 (35.2%, Rohm & Haas), 0.08 grams of Acusol® 882 (17.1%, Rohm & Haas) and 37.4 grams of distilled water were weighed. A stir bar was added and the solution was stirred until the Acusol® materials were dissolved. To this solution was added a mixture of 9.0 grams of polyester latex (Eastek 1000, Eastman) and 1 drop of Surfynol® PSA 336 (Air Products, 100%). The resulting solution was mixed thoroughly.

To the above solution, 22.8 grams of montmorrillonite SCPX-2973 slurry (9.21%) was mixed with 5.59 grams of glycine (Lab Safety Supply, 20%). The resulting solution was stirred with a stir bar for 1 hour and 1 drop of Mergal 680 (Troy Chemical Corporation, 26.3%) was added. The percent solids of the formulation were measured as 8.1% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 6.1 $cc/m^2$ day @ 1 atmosphere, 0% RH, 23° C. Permeability of the 0.6 micron polyester nanocomposite is 0.004 cc $mm/m^2$ day atmosphere @ 0% RH, 23° C. The reduction in permeability of this coating is 675 times the reduction in permeability of a coating made from the unfilled polyester latex.

Example 1C

8% Solids Polyester Nanocomposite Using SCPX-2973 Montmorrillonite Slurry Concentrated from Example 1A 50 grams of the nanocomposite from example 1A was placed in an 8 oz. jar. The jar with the lid removed was then placed into a water bath at 95° C. for 90 min while stirring.

The internal temperature of the formulation was maintained at 75° C. After the allotted time, the formulation was removed from the water bath and stirred overnight with the lid replaced. The percent solids of the concentrated formulation were measured as 8.3% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 5.0 cc/m$^2$ day @ 1 atmosphere, 0% RH, 23° C. Permeability of the 0.6 micron polyester nanocomposite is 0.003 cc mm/m$^2$ day atmosphere @ 0% RH, 23° C. The reduction in permeability of this coating is 900 times the reduction in permeability of a coating made from the unfilled polyester latex. The permeability is also 25% lower than the dispersion that was prepared at a target solids content of 8%.

Example 2A

5% Solids Polyester Nanocomposite Using SCPX-2953 Montmorrillonite Solid

In a 16 oz jar, 0.05 grams of Acusol® 880 (35.2%, Rohm & Haas), 0.1 grams of Acusol® 882 (17.1%, Rohm & Haas) and 78.9 grams of distilled water were weighed. A stir bar was added and the solution was stirred until the Acusol materials were dissolved. To this solution was added a mixture of 11.3 grams of polyester latex (Eastek 1000, Eastman) and 2 drop of Surfynol® PSA 336 (Air Products, 100%). The resulting solution was mixed thoroughly.

To the above solution, 2.63 grams of montmorrillonite SCPX-2953 solid (100%) was mixed with 6.98 grams of glycine (Lab Safety Supply, 20%) and 50 grams of distilled water. The resulting solution was stirred with a stir bar for 1 hour and 2 drops of Mergal 680 (Troy Chemical Corporation, 26.3%) was added. The percent solids of the formulation were measured as 4.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 6.5 cc/m$^2$ day @ 1 atmosphere, 0% RH, 23° C. Permeability of the 0.5 micron polyester nanocomposite is 0.004 cc mm/m$^2$ day atmosphere @ 0% RH, 23° C. The reduction in permeability of this coating is 675 times the reduction in permeability of a coating made from the unfilled polyester latex.

Example 2B

8% Solids Polyester Nanocomposite Using SCPX-2953 Montmorrillonite Solid

In an 8 oz jar, 0.04 grams of Acusol® 880 (35.2%, Rohm & Haas), 0.09 grams of Acusol® 882 (17.1%, Rohm & Haas) and 38.16 grams of distilled water were weighed. A stir bar was added and the solution was stirred until the Acusol materials were dissolved. To this solution was added a mixture of 9.0 grams of polyester latex (Eastek 1000, Eastman) and 1 drop of Surfynol® PSA 336 (Air Products, 100%). The resulting solution was mixed thoroughly.

To the above solution, 2.1 grams of montmorrillonite SCPX-2953 solid (100%) was mixed with 5.59 grams of glycine (Lab Safety Supply, 20%) and 20 grams of distilled water. The resulting solution was stirred with a stir bar for 1 hour and 1 drop of Mergal 680 (Troy Chemical Corporation, 26.3%) was added. The percent solids of the formulation were measured as 7.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 11.5 cc/m$^2$ day @ 1 atmosphere, 0% RH, 23° C. Permeability of the 0.6 micron polyester nanocomposite is 0.009 cc mm/m$^2$ day atmosphere @ 0% RH, 23° C. The reduction in permeability of this coating is 300 times the reduction in permeability of a coating made from the unfilled polyester latex.

Example 2C

8% Solids Polyester Nanocomposite Using SCPX-2953 Montmorrillonite Solid Concentrated from Example 2A 50 grams of the nanocomposite formulation of example 2A was placed in an 8 oz. jar. The jar with the lid removed was then placed into a water bath at 95° C. for 90 min while stirring. The internal temperature of the formulation was maintained at 75° C. After the allotted time, the formulation was removed from the water bath and stirred overnight with the lid replaced. The percent solids of the formulation was measured as 7.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 3.0 cc/m$^2$ day @ 1 atmosphere, 0% RH, 23° C. Permeability of the 0.6 micron polyester nanocomposite is 0.002 cc mm/m$^2$ day atmosphere @ 0% RH, 23° C. The reduction in permeability of this coating is 1350 times the reduction in permeability of a coating made from the unfilled polyester latex. The permeability is also 78% lower than the dispersion that was prepared at a target solids content of 8%.

Example 3A

5% Solids Polyester Nanocomposite Using SCPX-2041 Montmorrillonite Solid

In a 16 oz jar, 0.05 grams of Acusol® 880 (35.2%, Rohm & Haas), 0.1 grams of Acusol® 882 (17.1%, Rohm & Haas) and 78.94 grams of distilled water were weighed. A stir bar was added and the solution was stirred until the Acusol materials were dissolved. To this solution was added a mixture of 11.3 grams of polyester latex (Eastek 1000, Eastman) and 2 drop of Surfynol® PSA 336 (Air Products, 100%). The resulting solution was mixed thoroughly.

To the above solution, 2.63 grams of montmorrillonite SCPX-2041 solid (100%) was mixed with 6.98 grams of glycine (Lab Safety Supply, 20%) and 50 grams of distilled water. The resulting solution was stirred with a stir bar for 1 hour and 2 drops of Mergal 680 (Troy Chemical Corporation, 26.3%) was added. The percent solids of the formulation were measured as 5.0% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 17.1 cc/m$^2$ day @ 1 atmosphere, 0% RH, 23° C. Permeability of the 0.5 micron polyester nanocomposite is 0.013 cc mm/m$^2$ day atmosphere @ 0% RH, 23° C. The reduction in permeability of this coating is 207 times the reduction in permeability of a coating made from the unfilled polyester latex.

Example 3B

8% Solids Polyester Nanocomposite Using SCPX-2041 Montmorrillonite Solid

In an 8 oz jar, 0.04 grams of Acusol® 880 (35.2%, Rohm & Haas), 0.09 grams of Acusol® 882 (17.1%, Rohm & Haas) and 38.16 grams of distilled water were weighed. A stir bar was added and the solution was stirred until the Acusol materials were dissolved. To this solution was added a mixture of 9.02 grams of polyester latex (Eastek 1000, Eastman) and 1 drop of Surfynol® PSA 336 (Air Products, 100%). The resulting solution was mixed thoroughly.

To the above solution, 2.1 grams of montmorrillonite SCPX-2041 solid (100%) was mixed with 5.59 grams of glycine (Lab Safety Supply, 20%) and 20 grams of distilled water. The resulting solution was stirred with a stir bar for 1 hour and 1 drop of Mergal 680 (Troy Chemical Corporation, 26.3%) was added. The percent solids of the formulation were measured as 7.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 9.7 cc/m$^2$ day @ 1 atmosphere, 0% RH, 23° C. Permeability of the 0.6 micron polyester nanocomposite is 0.007 cc mm/m$^2$ day atmosphere @ 0% RH, 23° C. The reduction in permeability of this coating is 386 times the reduction in permeability of a coating made from the unfilled polyester latex.

Example 3C

8% Solids Polyester Nanocomposite Using SCPX-2041 Montmorrillonite Solid Concentrated from Example 3A 50 grams of the nanocomposite formulation from Example 3A was placed in an 8 oz. jar. The jar with the lid removed was then placed into a water bath at 95° C. for 90 min while stirring. The internal temperature of the formulation was maintained at 75° C. After the allotted time, the formulation was removed from the water bath and stirred overnight with the lid replaced. The percent solids of the formulation were measured as 9.0% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal 680 anti-microbial agent.

The oxygen transmission rate (OTR) is measured using a MOCON® OX-TRAN 2/20 module. The OTR is 7.5 cc/m$^2$ day @ 1 atmosphere, 0% RH, 23° C. Permeability of the 0.6 micron polyester nanocomposite is 0.005 cc mm/m$^2$ day atmosphere @ 0% RH, 23° C. The reduction in permeability of this coating is 540 times the reduction in permeability of a coating made from the unfilled polyester latex. The permeability is also 28% lower than the dispersion that was prepared at a target solids content of 8%.

The permeability data for Examples 1A through 3C are outlined in Table 1, below.

TABLE 1

Summary of Results

| Example | Oxygen Permeability (cc mm/m2 day atm @ 23 C., 0% RH) | | |
|---|---|---|---|
| | 5% solid | 8% as made | 8% concentrated |
| Ex. 1A-1C SCPX-2973 slurry | 0.008 | 0.004 | 0.003 |
| Ex. 2A-2C SCPX-2953 solid | 0.0035 | 0.009 | 0.0025 |
| Ex. 3A-3C SCPX-2041 solid | 0.013 | 0.007 | 0.005 |

The above results are further illustrated in FIG. 1, where it can be seen that for each composition, the 8% concentrated dispersions of the invention achieved the best barrier properties. This is surprising because, aside from the method of preparation, one would think that the composition and structure would be substantially identical to those which were prepared at an 8% solids level. Moreover, the improvement is dramatic, with the concentrated dispersions providing coatings which have permeability values which are 20% lower than the 8% as-made composition, and in some instances show improvements of more than 70%.

While the invention has been described in connection with several embodiments, modifications of those embodiments within the spirit and scope of the present invention will be readily apparent to those of skill in the art. The invention is defined in the appended claims.

What is claimed is:

1. A nanocomposite barrier coating on a substrate which is prepared by forming a film from a concentrated dispersion, said dispersion comprising:
   a) a liquid carrier medium which includes primarily water;
   b) an exfoliated montmorillonite filler material dispersed in the carrier medium; and
   c) a matrix polyester polymer which is dispersed in the carrier medium,
wherein the concentrated dispersion is prepared by dispersing the filler material and the polymer matrix in the liquid carrier medium, and increasing the weight percent solids content of the initial dispersion by at least 5% thereof by selectively removing a portion of the liquid carrier medium prior to application on the substrate, wherein the coating exhibits an oxygen permeability that is at least 10 percent lower than a like coating that is prepared with a like dispersion which is not concentrated by selectively removing a portion of the liquid carrier medium.

2. The nanocomposite barrier coating according to claim 1, wherein the coating exhibits an oxygen permeability that is at least 20 percent lower than a like coating that is prepared with a like dispersion which is not concentrated by selectively removing a portion of the liquid carrier medium.

3. The nanocomposite barrier coating according to claim 1, wherein the coating exhibits an oxygen permeability of less than 0.02 cc-mm/m$^2$-day-atm.

4. The nanocomposite barrier coating according to claim 1, wherein the coating exhibits an oxygen permeability of less than 0.01 cc-mm/m$^2$-day-atm.

5. The nanocomposite barrier coating according to claim 1, wherein the weight percent solids content of the initial dispersion is increased by at least 25% thereof by selectively removing a portion of the liquid carrier medium.

6. The nanocomposite barrier coating according to claim 1, wherein the weight percent solids content of the initial dispersion is increased by at least 50% thereof by selectively removing a portion of the liquid carrier medium.

7. The nanocomposite barrier coating according to claim 1, wherein the solids content of the initial dispersion is increased by evaporating off a portion of the liquid carrier medium.

8. The nanocomposite barrier coating according to claim 1, wherein the concentrated dispersion has a solids content in the range of from 5 to 25 weight percent.

9. The nanocomposite barrier coating according to claim 1, wherein the concentrated dispersion has a solids content in the range of from 7 to 15 weight percent.

10. The nanocomposite barrier coating according to claim 1, wherein the concentrated dispersion further includes at least one adjuvant selected from the group consisting of surfactants, anti-foaming agents, dispersing agents, wetting agents, leveling agents and thickeners.

* * * * *